M. L. DELAVAN & J. DYSON.
Improvement in Door-Bells.
No. 4,932.
Reissued June 4, 1872.
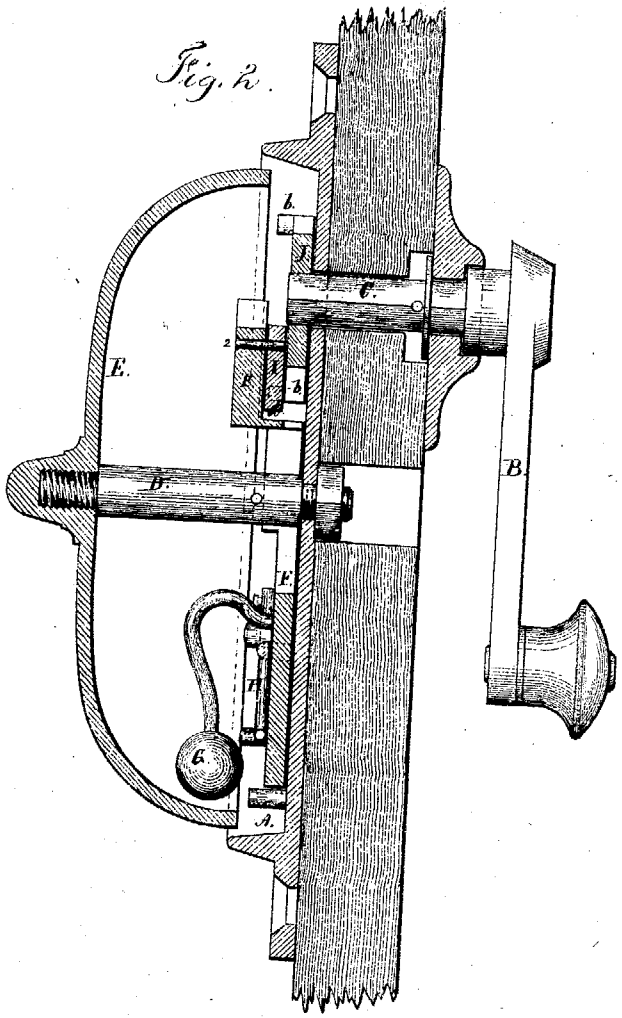
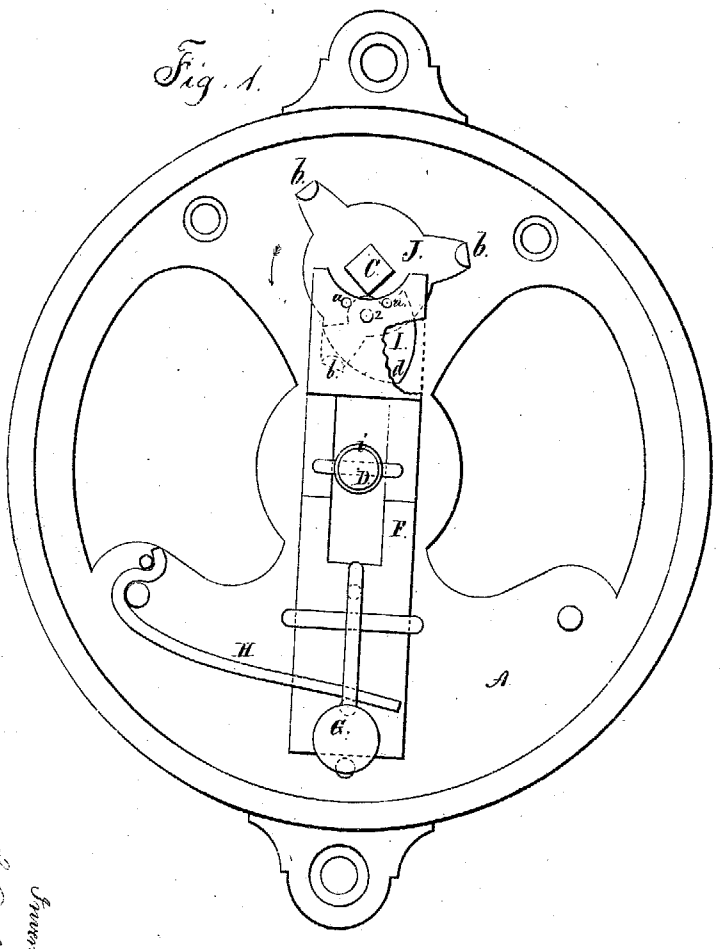
Witnesses,
Chas. H. Smith
Geo. W. Hasler.
Inventors
Marcus L. Delavan.
Job Dyson.
Lemuel W. Serrell
atty.
AM. PHOTO-LITHOGRAPHIC CO. N.Y. (OSBORNE'S PROCESS.)

UNITED STATES PATENT OFFICE.

MARCUS L. DELAVAN AND JOB DYSON, OF NEW BRITAIN, CONNECTICUT; SAID DELAVAN ASSIGNOR, BY MESNE ASSIGNMENTS, TO P. & F. CORBIN.

IMPROVEMENT IN DOOR-BELLS.

Specification forming part of Letters Patent No. 67,030, dated July 23, 1867; reissue No. 4,932, dated June 4, 1872.

*To all whom it may concern:*

Be it known that we, MARCUS L. DELAVAN and JOB DYSON, of New Britain, in the county of Hartford and State of Connecticut, have invented an Improvement in Door-Bells; and the following is declared to be a correct description of the same.

Before our invention a door-bell had been actuated by revolving a spindle in either direction by means of a knob or crank-handle, as seen in Letters Patent No. 30,509 and 39,796. In these cases two hammers were employed, and one was operated while turning the spindle in one direction and the other while the spindle was moved the other way.

Our invention was made for dispensing with one of the hammers by constructing the connection between the spindle and the hammer so that said hammer would be operated equally well when the spindle was revolved in either direction.

We make use of an intermediate cam-piece between the spindle and the hammer-tail, which is free to swing into a different position when the spindle is being turned in one direction from what it occupies when the spindle is turned in the other direction; thereby said moving cam-piece becomes the means for transmitting motion from the spindle to the hammer, and swings or turns out of the way as the stroke is made by the hammer, so that the movement of the hammer shall be free and unobstructed when the blow is given, and this action of the intermediate cam-piece is the same when the spindle is rotated in either direction.

In the drawing, Figure 1 is a view of the bell mechanism, with the bell itself removed; and Fig. 2 is a central sectional view of the bell and mechanism.

The plate or frame A is of suitable size and shape, and the spindle *c*, from the crank or knob B, passes through the door as usual, and the same is connected with the actuator J, preferably by the square spindle entering a similarly-shaped hole in the actuator. The bell E is fastened by the column or support D, and the hammer G is projected by a spring, H. Upon revolving the actuator J in either direction the hammer will be moved away from the bell and liberated, so as to be projected by its spring and strike the bell a blow that is not impeded by the actuating mechanism. We have shown the hammer G upon a slide, F, and the actuator as provided with projections *b*, and the intermediate cam I upon the under side of the slide F. This intermediate cam is shown as attached by the fulcrum-pin 2, and its swinging or turning movement limited by the stops *a a*.

As the actuator J is revolved one of its projections *b* comes into contact with the cam I, and moves the same and draws the hammer away from the bell. At the point *d* of the cam the actuating parts separate and the cam is free to move; hence this intermediate cam will not interfere with the sudden movement of the hammer as projected by its spring to strike the bell. The intermediate cam I is represented in the position to which it will be moved upon turning the spindle C in the direction indicated by the arrow; but if said spindle C is revolved the other way the action of the intermediate cam will be the same as before described, but it will be swung or turned into the opposite position relatively to the actuating parts.

The advantages of operating the bell by revolving the spindle in either direction is apparent; and our improvement requiring only one hammer, much complication is avoided.

It will be obvious that, instead of the two stops *a a* to the intermediate cam I, a single stop affixed to the latter playing in a slot, or vice versa, may be used; also that various equivalents for the slide F and actuator J may be substituted, and that the hammer G may be indirectly, instead of directly, connected with the slide or its equivalent.

We claim as our invention—

1. A moving cam interposed between the actuating spindle and a single hammer, substantially as set forth, to actuate the hammer when the spindle is turned in either direction, substantially as set forth.

2. The combination of a single hammer for a bell, a spindle, an actuator that communicates the motion of said spindle when revolved in either direction to a single hammer and an intermediate cam-piece that transmits the motion to the hammer, but moves as the actuating parts separate, so that the movement of the hammer to strike the bell is unobstructed, substantially as set forth.

Signed by us this 17th day of April, 1872.

MARCUS L. DELAVAN.
JOB DYSON.

Witnesses:

ORVILLE H. PLATT,
LEVI E. COE.